(12) United States Patent
Lee et al.

(10) Patent No.: US 8,034,478 B2
(45) Date of Patent: Oct. 11, 2011

(54) SECONDARY BATTERY OF IMPROVED SAFETY

(75) Inventors: Hyang Mok Lee, Seoul (KR); Byungjin Choi, Daejeon (KR); Jun Hwan Jang, Seoul (KR); Hyun-Chul Jung, Incheon (KR); JeongSam Son, Daejeon (KR); Chang bum Ahn, Daejeon (KR); Hyung Ku Yun, Daejeon (KR)

(73) Assignee: LG Chem, Ltd. (KR)

( * ) Notice: Subject to any disclaimer, the term of this patent is extended or adjusted under 35 U.S.C. 154(b) by 1233 days.

(21) Appl. No.: 11/490,960

(22) Filed: Jul. 21, 2006

(65) Prior Publication Data

US 2007/0231683 A1 Oct. 4, 2007

(30) Foreign Application Priority Data

Mar. 30, 2006 (KR) ........................ 10-2006-0028677

(51) Int. Cl.
*H01M 2/00* (2006.01)
*H01M 2/26* (2006.01)
(52) U.S. Cl. ........................ 429/163; 429/161
(58) Field of Classification Search ........... 429/161–163
See application file for complete search history.

(56) References Cited

U.S. PATENT DOCUMENTS 7,122,276 B2 * 10/2006 Gu ................................ 429/162

FOREIGN PATENT DOCUMENTS

| JP | 2000-200584 | 7/2000 |
|----|-------------|--------|
| KR | 1020010082058 | 8/2001 |
| KR | 1020010082059 | 8/2001 |
| KR | 1020010082060 | 8/2001 |

* cited by examiner

*Primary Examiner* — Karie O'Neill Apicella
(74) *Attorney, Agent, or Firm* — Cantor Colburn LLP

(57) ABSTRACT

Disclosed herein is a secondary battery having an electrode assembly received in a receiving part of a battery case, the electrode assembly being constructed in a structure in which pluralities of cathodes and anodes are stacked one on another while separators are disposed between the respective cathodes and anodes, and electrode taps extending from the stacked cathodes and anodes are coupled to electrode leads, wherein the receiving part of the battery case is provided at the outer upper end thereof with a depressed step such that at least a portion of the inner upper end of the receiving part of the battery case excluding the electrode taps-electrode lead coupling parts of the electrode assembly is in tight contact with the upper end of the electrode assembly.

13 Claims, 7 Drawing Sheets

SECONDARY BATTERY OF IMPROVED SAFETY

FIELD OF THE INVENTION

The present invention relates to a secondary battery having improved safety, and, more particularly, to a secondary battery having an electrode assembly received in a receiving part of a battery case, the electrode assembly being constructed in a structure in which pluralities of cathodes and anodes are stacked one on another while separators are disposed between the respective cathodes and anodes, and electrode taps extending from the stacked cathodes and anodes are coupled to electrode leads, wherein the receiving part of the battery case is provided at the outer upper end thereof with a depressed step such that at least a portion of the inner upper end of the receiving part of the battery case is in tight contact with the upper end of the electrode assembly.

BACKGROUND OF THE INVENTION

As mobile devices have been increasingly developed, and the demand of such mobile devices has increased, the demand of batteries has also sharply increased as an energy source for the mobile devices. Also, much research on batteries satisfying various needs has been carried out.

In terms of the shape of the batteries, the demand of prismatic secondary batteries or pouch-shaped secondary batteries, which are thin enough to be applied to products, such as mobile phones, is very high. In terms of the material for the batteries, the demand of lithium secondary batteries, such as lithium ion polymer batteries, having high energy density, high discharge voltage, and high output stability, is very high.

Furthermore, the secondary batteries may be classified based on the construction of an electrode assembly having a cathode/a separator/an anode structure. For example, the electrode assembly may be constructed in a jelly-roll (winding) type structure in which long-sheet type cathodes and anodes are wound while separators are disposed between the respective cathodes and anodes, a stacking type structure in which pluralities of cathodes and anodes having a predetermined size are successively stacked one on another while separators are disposed between the respective cathodes and anodes, or a stacking/folding type structure in which pluralities of cathodes and anodes having a predetermined size are successively stacked one on another while separators are disposed between the respective cathodes and anodes to constitute a bi-cell or a full-cell, and then the bi-cell or a full-cell is wound.

Recently, much interest has been taken in a pouch-shaped battery having such a stacking or stacking/folding electrode assembly mounted in a pouch-shaped battery case made of an aluminum laminate sheet because of low manufacturing costs, light weight, and easy modification in shape, and, as a result, the use of the pouch-shaped battery has gradually increased.

FIG. 1 is an exploded perspective view illustrating the general structure of a conventional pouch-shaped secondary battery.

Referring to FIG. 1, the pouch-shaped secondary battery 10 includes an electrode assembly 30, electrode taps 40 and 50 extending from the electrode assembly, electrode leads 60 and 70 welded to the electrode taps 40 and 50, respectively, and a battery case 20 for receiving the electrode assembly 30.

The electrode assembly 30 is a power generating element comprising cathodes and anodes successively stacked one on another while separators are disposed between the respective cathodes and anodes. The electrode assembly 30 is constructed in a stacking structure or a stacking/folding structure. The electrode taps 40 and 50 extend from electrode plates of the electrode assembly 30. The electrode leads 60 and 70 are electrically connected to the pluralities of electrode taps 40 and 50 extending from the electrode plates of the electrode assembly 30, for example, by welding. The electrode leads 60 and 70 are partially exposed to the outside of the battery case 20. To the upper and lower surfaces of the electrode leads 60 and 70 is partially attached insulative film 80 for improving sealability between the battery case 20 and the electrode leads 60 and 70 and, at the same time, for accomplishing electrical isolation between the battery case 20 and the electrode leads 60 and 70.

The battery case 20 is made of an aluminum laminate sheet. The battery case 20 has a space for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced apart from the electrode assembly 30 such that the plurality of cathode taps 40 and the plurality of anode taps 50 can be coupled to the electrode leads 60 and 70, respectively.

FIG. 2 is an enlarged sectional view illustrating the inner upper end of the battery case of the secondary battery shown in FIG. 1, in which the cathode taps are coupled to each other in a concentrated state and connected to the cathode lead, and FIG. 3 is a front see-through view illustrating the secondary battery of FIG. 1 in an assembled state.

Referring to these drawings, the plurality of cathode taps 40, which extend from a cathode collector 41 of the electrode assembly 30, are connected to one end of the cathode lead 60, for example, in the form of a welded bunch constituted by integrally combining the cathode taps 40 with each other by welding. The cathode lead 60 is sealed by the battery case 20 while the other end 61 of the cathode lead 60 is exposed to the outside of the battery case 20. Since the plurality of cathode taps are combined with each other to constitute the welded bunch, the inner upper end of the battery case 20 is spaced a predetermined distance from the upper end surface of the electrode assembly 30, and the cathode taps 40 combined in the form of the welded bunch are bent approximately in the shape of V. Hereinafter, the coupling region between the electrode taps and the electrode lead will be referred to as a "V-form region."

When the battery drops with the upper end of the battery, i.e., the cathode lead 60 of the battery, down, or an external physical force is applied to the upper end of the battery, however, the electrode assembly 30 moves toward the inner upper end of the battery case 20, or the upper end of the battery case 20 is crushed. As a result, the anode of the electrode assembly 30 is brought into contact with the cathode taps 42 or the cathode lead 61, and therefore, short circuits may occur inside the battery. Consequently, the safety of the battery is greatly lowered.

In order to solve the above-mentioned problem, the present invention provides a structure in which V-form regions in a receiving part of the battery case are modified into a predetermined shape.

In connection with this case, technologies for modifying the receiving part of the battery case have been proposed. As an example, Japanese Unexamined Patent Publication No. 2002-200584 discloses a structure in which pluralities of grooves and flat parts are formed along the side of a receiving part of a battery case constructed in a trapezoidal shape when viewing the vertical section of the battery case such that an electrode assembly can be brought into tight contact with the inner surface of the receiving part of the battery case. However, the disclosed technology has a drawback in that the grooves and the flat parts must be formed at the side of the battery case, which has relatively small height, and therefore, it is difficult to form the grooves and the flat parts. When using the disclosed technology, it is possible to improve the attachment of the electrode assembly to the battery case in a battery structurally having no V-form regions (for example, a prismatic jelly-roll type battery). However, it has been proved that the disclosed technology cannot prevent the movement of the electrode assembly toward the electrode taps in a battery having V-form regions for the coupling between the electrode taps and the electrode leads, as described above.

Consequently, a technology for manufacturing a battery while effectively utilizing the V-form regions, which do not contribute to the capacity and the operation of the battery, and preventing the occurrence of short circuits due to the movement of the electrode assembly is highly required.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, in a secondary battery having an electrode assembly, which includes electrode taps-electrode lead coupling parts (V-form regions), mounted therein, when a receiving part of a battery case corresponding to the V-form regions is modified in a specific shape such that the electrode assembly can be brought into tight contact with the battery case, the V-form regions, which do not contribute to the capacity and the operation of the battery, are effectively utilized, and the shape of battery case is easily modified with the result that the occurrence of short circuits inside the secondary battery due to application of an external force to the secondary battery, for example, dropping of the secondary battery, is prevented, and therefore, the safety of the secondary battery is further improved. The present invention has been completed based on the above-mentioned discovery.

In accordance with the present invention, the above and other objects can be accomplished by the provision of a secondary battery having an electrode assembly received in a receiving part of a battery case, the electrode assembly being constructed in a structure in which pluralities of cathodes and anodes are stacked one on another while separators are disposed between the respective cathodes and anodes, and electrode taps extending from the stacked cathodes and anodes are coupled to electrode leads, wherein the receiving part of the battery case is provided at the outer upper end thereof with a depressed step such that at least a portion of the inner upper end of the receiving part of the battery case excluding the electrode taps-electrode lead coupling parts of the electrode assembly is in tight contact with the upper end of the electrode assembly.

The occurrence of short circuits inside the battery due to dropping of the battery or application of an external force to the battery may act as a principal factor of explosion or catching fire of the battery. This is because, when the battery drops or an external force is applied to the battery, the electrode assembly is moved, and therefore, the cathodes and the anodes are brought into contact with each other. High resistance heat is generated due to conducting current in the contact resistance parts. When the interior temperature of the battery exceeds a critical temperature level due to the high resistance heat, the oxide structure of a cathode active material is collapsed, and therefore, a thermal runaway phenomenon occurs. As a result, the battery may catch fire or explode.

In the secondary battery, on the other hand, the electrode assembly is mounted in the battery case while the electrodes of the electrode assembly are stably located in position due to the depressed step formed at a predetermined region of the battery case. Consequently, even when the battery drops or an external force is applied to the battery, the movement of the electrodes in the electrode assembly is restrained, and therefore, the occurrence of short circuits inside the battery is prevented, and, ultimately, the safety of the battery is improved.

Furthermore, the depressed step is formed at the electrode taps-electrode lead coupling parts necessary to accomplish the coupling between the electrode taps and the electrode leads, i.e., the V-form regions. Consequently, the regions which do not contribute to the capacity and the operation of the battery are effectively utilized.

In order that the inner upper end of the receiving part of the battery case is brought into tight contact with the upper end of the electrode assembly due to the step, it is necessary that the a portion of the upper end as well as the side of the receiving part of the battery case be modified when viewing the vertical section of the step. The step is depressed when viewing the upper end of the battery. Accordingly, the step is referred to as a "depressed step" in the present invention.

The depressed step is formed by considerably modifying the regions of the receiving part of the battery case corresponding to the V-form regions. Consequently, it is easier to form the depressed step according to the present invention than minutely form the receiving part according to the conventional art as previously described.

The electrode assembly is not particularly restricted so long as pluralities of electrode taps are connected with each other to constitute cathodes and anodes. Preferably, the electrode assembly is constructed in a stacking structure and/or a stacking/folding structure. The details of an electrode assembly constructed in such a stacking/folding structure are disclosed in Korean Unexamined Patent Publication No. 2001-0082058, No. 2001-0082059, and No. 2001-0082060, which have been filed in the name of the applicant of the present application. The disclosure of the above-mentioned patent publications is hereby incorporated by reference.

The position of the depressed step according to the present invention is not particularly restricted so long as the inner upper end of the battery case can be brought into tight contact with the upper end of the electrode assembly. As an example, the depressed step may be formed at one side or each side of the upper end of the receiving part of the battery case (A structure). Alternatively, the depressed step may be formed at the middle of the upper end of the receiving part of the battery case corresponding to the space defined between two electrode taps-electrode lead coupling parts in a battery having cathode and anode leads protruding from the upper end of the battery case (B structure).

In the A structure, the depressed step may extend from the upper end of the electrode assembly to the electrode taps-electrode lead coupling parts of the electrode assembly.

In the B structure, the depressed step is formed at the middle of the upper end of the receiving part of the battery case, and therefore, it is relatively easy to vertically bend the side sealing part such that the side sealing part can be brought into tight contact with the receiving part while the battery case is sealed after the electrode assembly is received in the receiving part so as to reduce the total size of the battery. Consequently, the B structure is preferred to the A structure.

The depressed step may be formed during a subsequent process after the electrode assembly is mounted in the battery case or the battery case is sealed. More preferably, the depressed step is formed simultaneously when the receiving part is formed at the battery case. The formation of the receiving part at the sheet-type battery case may be accomplished, for example, by a drawing process. The subsequent process for forming the depressed step may be carried out either manually or automatically through the operation of a machine.

In the secondary battery according to the present invention, the battery case is made of a laminate sheet including a metal layer and a resin layer. Preferably, the battery case is a pouch-shaped case, made of an aluminum laminate sheet, having a receiving part for receiving the electrode assembly. Preferably, the battery case made of the laminate sheet is sealed by thermal welding after the electrode assembly is received in the receiving part of the battery case.

More preferably, the thermal welding is also performed to the depressed step region when the battery case is sealed by the thermal welding. Since the battery case made of the laminate sheet has low mechanical strength, the battery case may be easily deformed when an external force is applied to the battery case. As a result, the depressed step region may be deformed when large pressure is applied to the depressed step region from the electrode assembly due to several causes. When the depressed step region of the battery case is thermally welded, on the other hand, such deformation of the depressed step region is fundamentally prevented, and therefore, the safety of the secondary battery is further improved.

Preferably, the secondary battery according to the present invention is a lithium secondary battery. Especially, the present invention is preferably applied to a lithium-ion polymer battery in which the electrode assembly is impregnated with a lithium-contained electrolyte in a gel phase.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
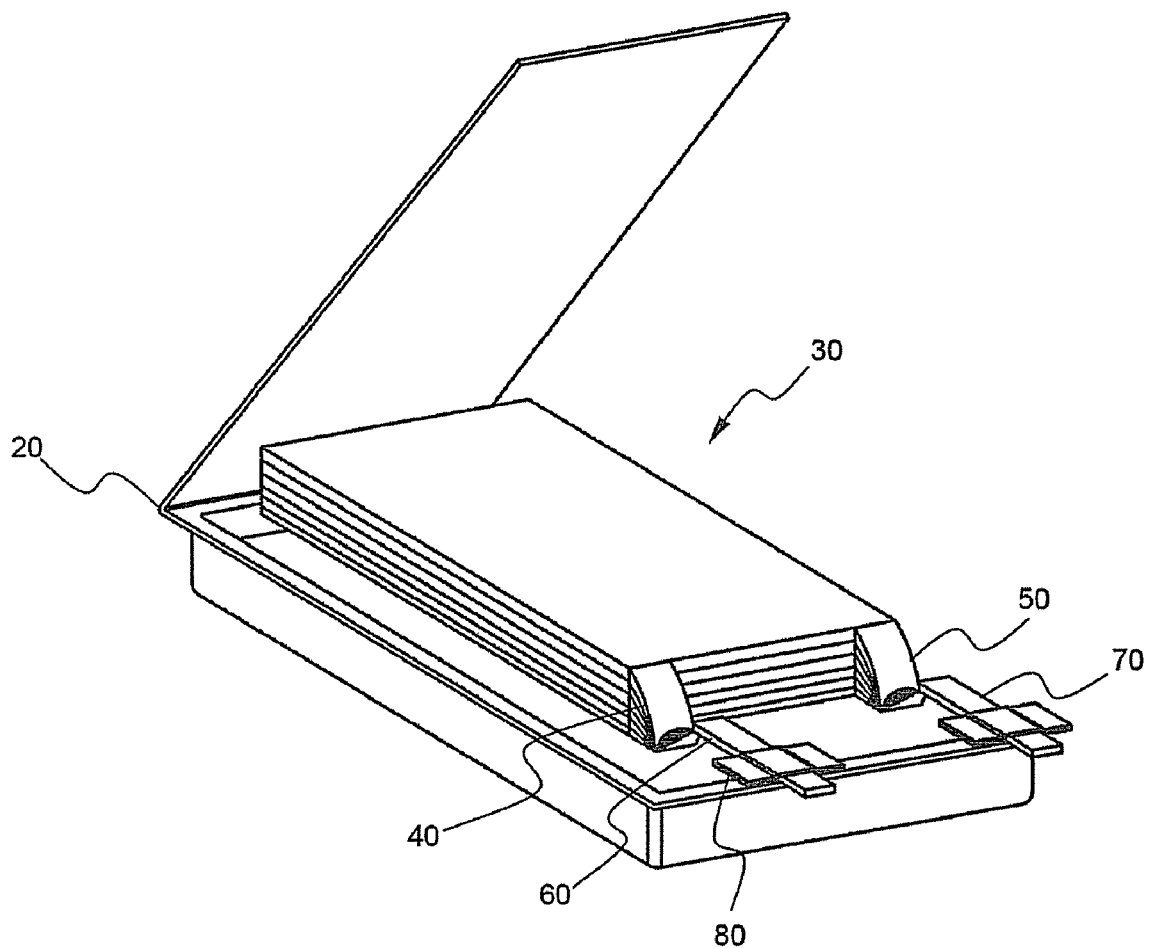
FIG. 1 is an exploded perspective view illustrating the general structure of a conventional pouch-shaped secondary battery.
Figure 2:
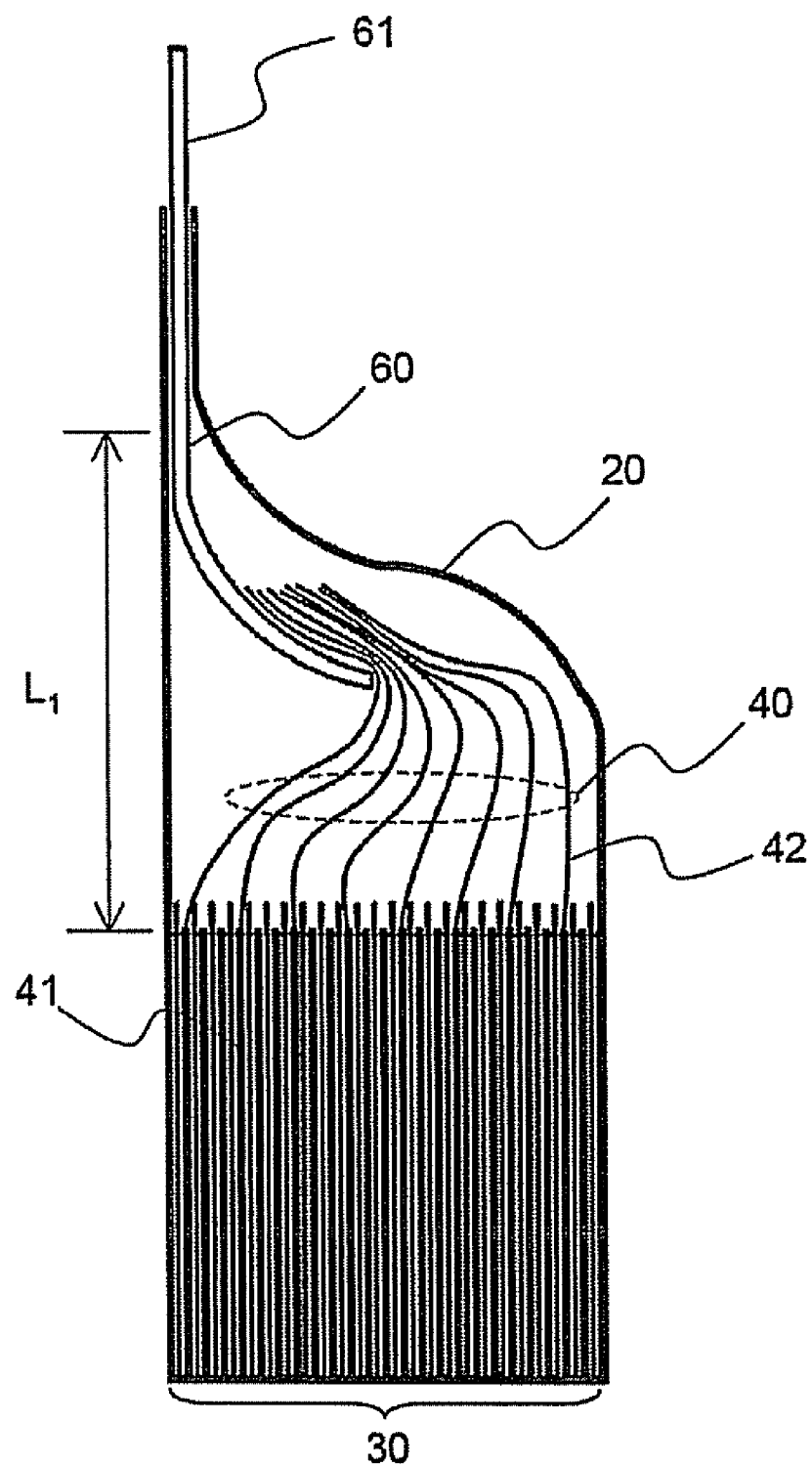
FIG. 2 is an enlarged sectional view illustrating the inner upper end of a battery case of the secondary battery shown in FIG. 1, in which cathode taps are coupled to each other in a concentrated state and connected to a cathode lead.
Figure 3:
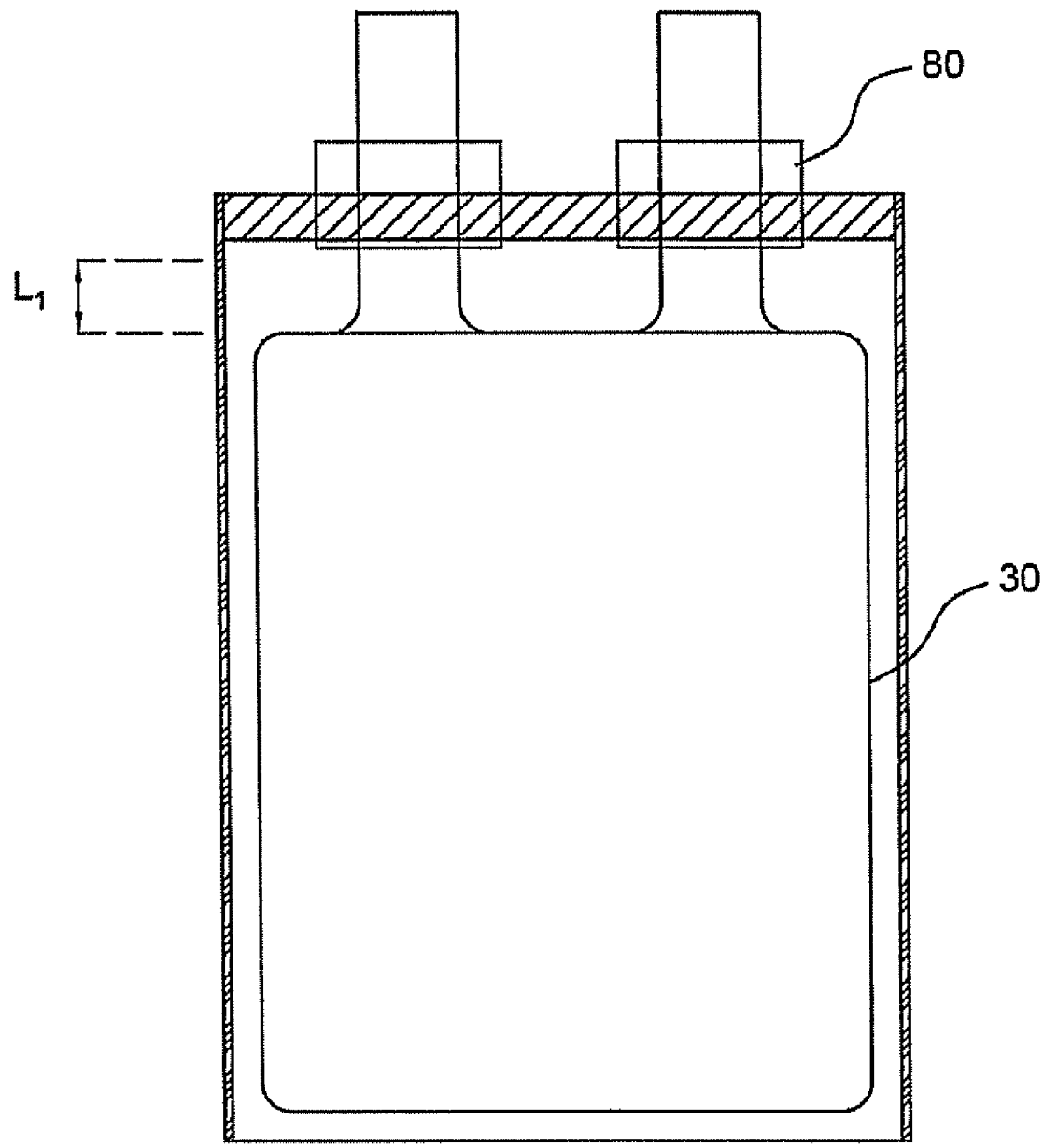
FIG. 3 is a front see-through view illustrating the secondary battery of FIG. 1 in an assembled state.
Figure 4:
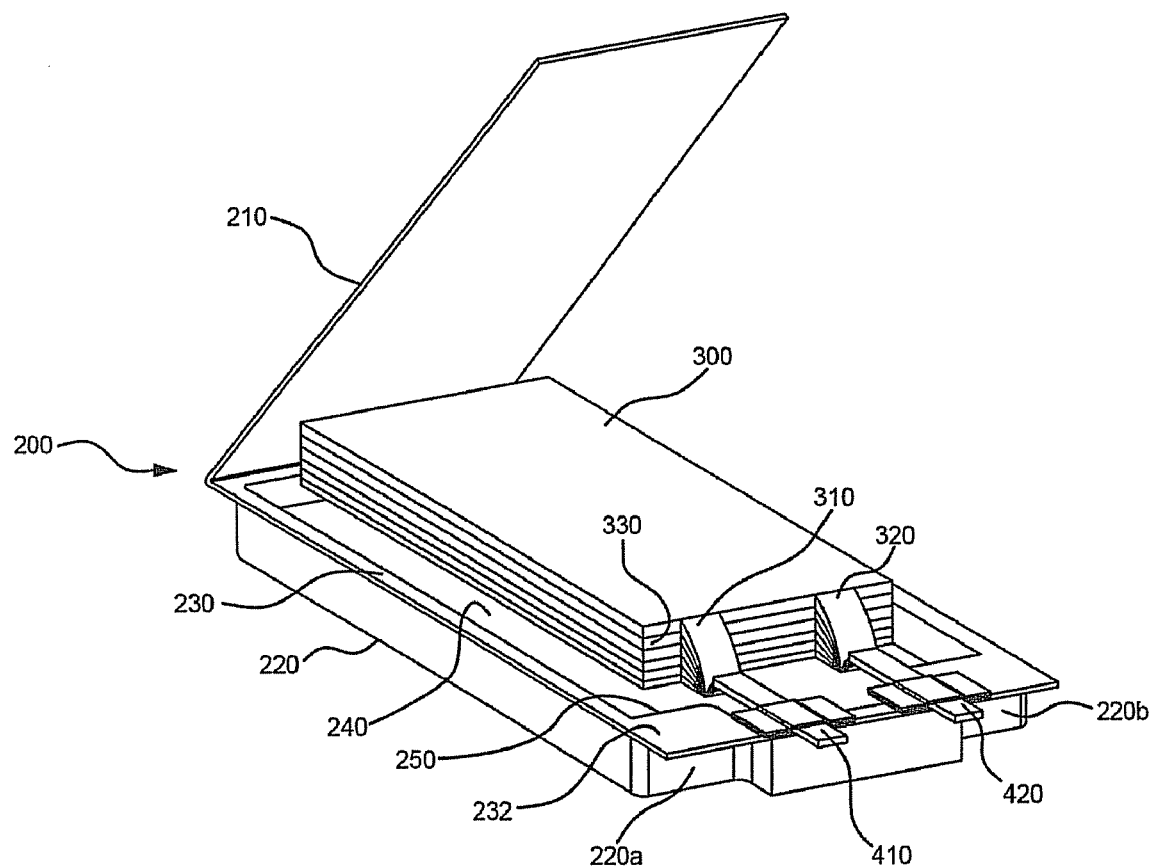
FIG. 4 is an exploded perspective view illustrating a pouch-shaped secondary battery according to a preferred embodiment of the present invention.
Figure 5:
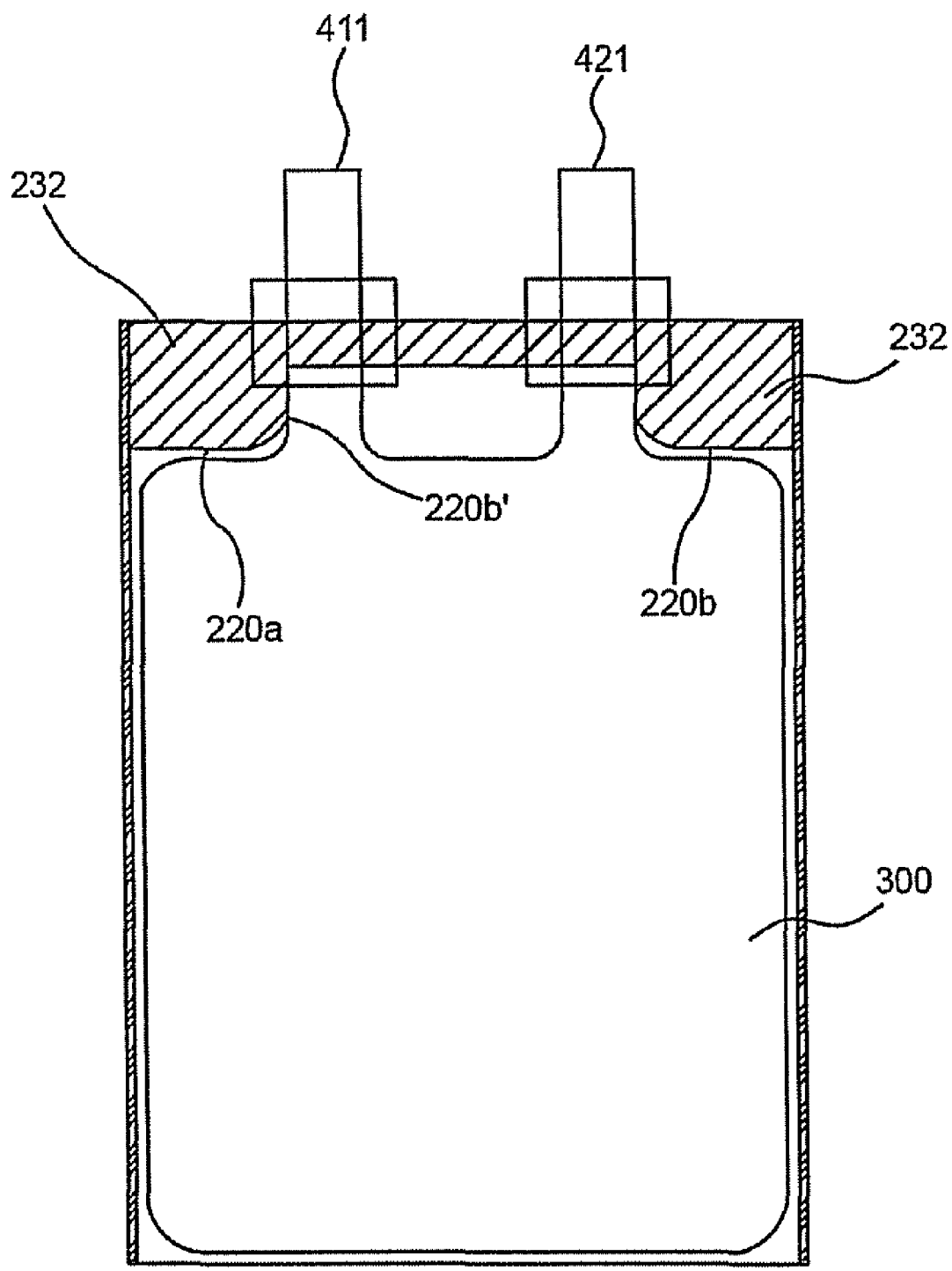
FIG. 5 is a front see-through view illustrating the secondary battery of FIG. 4 in an assembled state.
Figure 6:
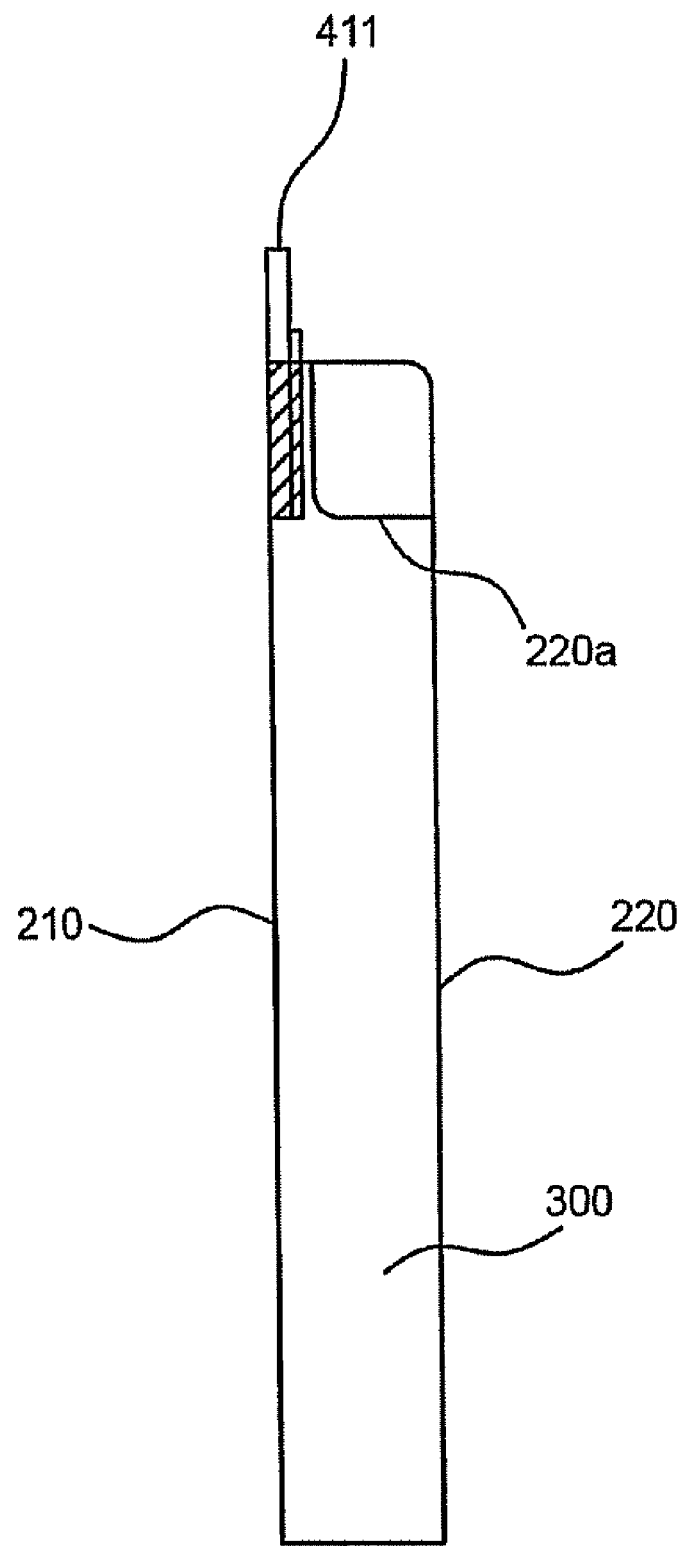
FIG. 6 is a side see-through view illustrating the secondary battery of FIG. 4 in an assembled state.

FIG. 4 is an exploded perspective view illustrating a pouch-shaped secondary battery according to a preferred embodiment of the present invention, FIG. 5 is a front see-through view illustrating the secondary battery of FIG. 4 in an assembled state, and FIG. 6 is a side see-through view illustrating the secondary battery of FIG. 4 in an assembled state.

Referring to these drawings, the pouch-shaped secondary battery 200 includes an electrode assembly 300 having cathode taps 310 welded to a cathode lead 410 and anode taps 320 welded to an anode lead 420, a battery case 200 for receiving the electrode assembly 300, and depressed steps 220a and 220b formed at upper end corners of the battery case 200.

The battery case 200 includes a lower case member 220 defining a receiving part 240 in which the electrode assembly 300 is received, and an upper case member 210 integrally connected to the lower end of the lower case member 220. Also, a sealing part 230 is formed along the edge of the battery case 200 such that the upper case member 210 and the lower case member 220 can be securely attached to each other by thermal welding, and therefore, the battery case 200 can be sealed, during the assembly process of the secondary battery 200. After the upper case member 210 and the lower case member 220 are securely attached to each other by thermal welding, the side sealing part 230 is vertically bent such that the side sealing part 230 can be brought into tight contact with the receiving part 240 of the lower case member 220, whereby the total size of the battery is reduced.

The depressed steps 220a and 220b extend from both sides of the upper end of the electrode assembly 300 to the regions where the electrode taps 310 and 320 protrude (i.e., the electrode taps-electrode lead coupling parts). Consequently, when the electrode assembly 300 is mounted in the lower case member 220 of the battery case 200, the both sides of the upper end 330 of the electrode assembly 300 are brought into tight contact with a corresponding inner upper end 250 of the lower case member 220, i.e., the lower end surfaces of the depressed steps 220a and 220b, whereby the electrode assembly 300 is stably fixed. Due to this tight contact structure, the movement of the electrode assembly 300 is restrained, and therefore, the occurrence of short circuits inside the battery is effectively prevented, even when the secondary battery 100 drops with the electrode leads 410 and 420 down or an external force is applied to the upper end of the secondary battery 100.

Furthermore, both sides of the upper end sealing part 232 have a relatively large width due to the formation of the steps 220a and 220b, and the both sides of the upper end sealing part 232 are securely attached to the upper case member 210 by thermal welding during the assembly process of the battery. Consequently, the steps 220a and 220b are maintained in a more stable structure.

Figure 7:
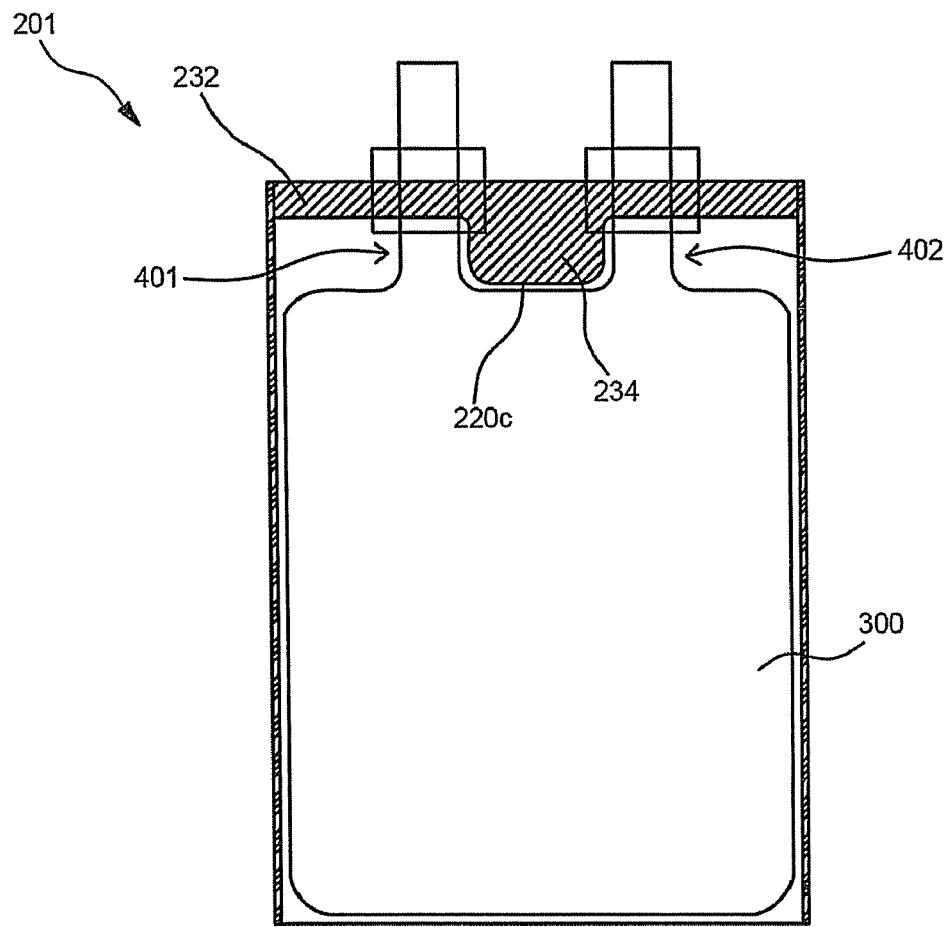
FIG. 7 is a partial plan view illustrating a secondary battery according to another preferred embodiment of the present invention.
Figure 8:
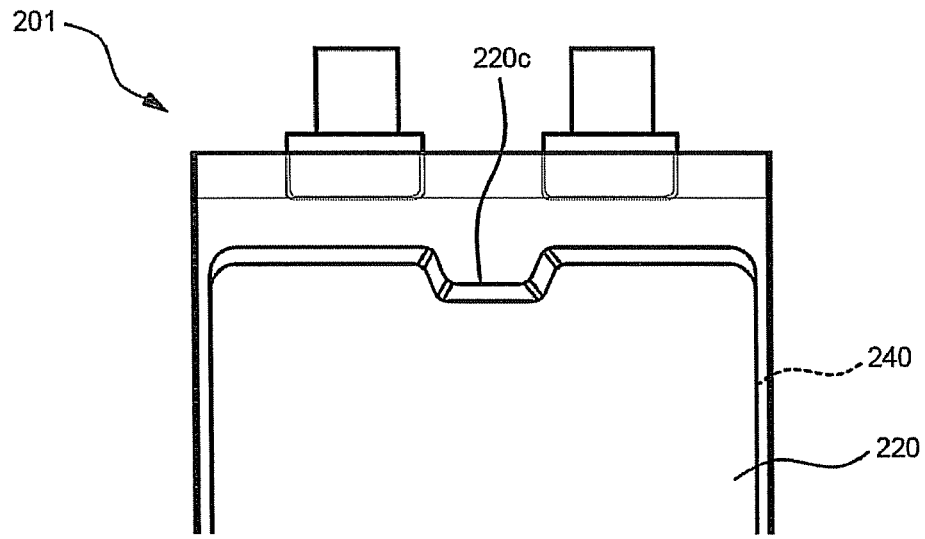
FIG. 8 is a front see-through view illustrating the secondary battery of FIG. 7.

FIGS. 7 and 8 are a partial plan view and a front see-through view illustrating a secondary battery according to another preferred embodiment of the present invention.

Referring to these drawings, the secondary battery 201 is different from the secondary battery 200 of FIG. 5 in that a depressed step 220c is formed in the space defined between the electrode taps-electrode lead coupling parts 401 and 402, and thermal welding is performed to the depressed step 220c, whereby an extension sealing part 234 is formed while the extension sealing part 234 extends from the upper end sealing part 232. Since the depressed step 220c elastically presses the electrode assembly 300, and the stable structure is maintained as previously described, however, the secondary battery 201 according to this embodiment has the same effect as the secondary battery of FIG. 5. Furthermore, the thermal welding portion is increased due to the extension sealing part 234, and therefore, more excellent safety of the secondary battery is accomplished.

The depressed step 220c is formed during a drawing process for forming the receiving part 240 of the battery case 220, and the depressed step 220c is located at the corresponding region between the electrode taps-electrode lead coupling parts 401 and 402. Consequently, it is easier to vertically bend the side sealing part 230 such that the side sealing part 230 can be brought into tight contact with the receiving part 240 of the battery case 220.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the movement of the electrode assembly is restrained even when the secondary battery according to the present invention drops or an external force is applied to the secondary battery, and therefore, the occurrence of short circuits inside the secondary battery is effectively prevented. Consequently, the secondary battery according to the present invention provides further improved safety.

What is claimed is:

1. A secondary battery, comprising:
   a battery case comprising a receiving part;
   an electrode assembly disposed in the receiving part, the electrode assembly comprising
      a plurality of cathodes and a plurality of anodes, which are stacked one on another, and separators, which are disposed between respective cathodes and anodes; and
      electrode taps extending from the cathodes and anodes, coupled to electrode leads and extending from an end of the electrode assembly,
   wherein a first portion of an end of the receiving part comprises a depressed step, which is adjacent to at least a portion of the electrode leads and which contacts the end of the electrode assembly, and
   a second portion of the end of the receiving part is spaced apart from the end of the electrode assembly.

2. The secondary battery according to claim 1, wherein the electrode assembly is constructed in a stacking structure and/or a stacking/folding structure.

3. The secondary battery according to claim 1, wherein the depressed step is disposed at one side or each side of the end of the receiving part, which is adjacent to the end of the electrode assembly.

4. The secondary battery according to claim 1, wherein the depressed step is disposed at a middle portion of an end of the receiving part, wherein the middle portion corresponds to a space defined between the electrode taps and electrode leads of the electrode assembly.

5. The secondary battery according to claim 3, wherein the depressed step extends from the end of the electrode assembly to the electrode taps and electrode leads of the electrode assembly.

6. The secondary battery according to claim 1, wherein the depressed step is formed after the electrode assembly is mounted in the battery case or the battery case is sealed.

7. The secondary battery according to claim 1, wherein the depressed step is formed simultaneously when the receiving part is formed at the battery case.

8. The secondary battery according to claim 1, wherein the battery case is made of a laminate sheet including a metal layer and a resin layer, and the battery case is sealed by thermal welding after the electrode assembly is received in the receiving part of the battery case.

9. The secondary battery according to claim 8, wherein the thermal welding is also performed to a depressed step region when the battery case is sealed by the thermal welding.

10. The secondary battery according to claim 8, wherein the sheet is an aluminum laminate sheet.

11. The secondary battery according to claim 1, wherein the battery is a lithium-ion polymer battery.

12. A method of manufacturing the secondary battery of claim 1, the method comprising:
    mounting an electrode assembly in a battery case or sealing a battery case; then
    forming a depressed step.

13. A method of manufacturing the secondary battery of claim 1, the method comprising:
    forming a depressed step; and
    simultaneously forming a receiving part.

* * * * *